RE 25285

Dec. 27, 1960 W. D. CANNON 2,966,633

DELAY AND AMPLITUDE CORRECTIVE SYSTEM

Filed Aug. 12, 1958 2 Sheets-Sheet 1

INVENTOR.
W. D. CANNON

BY Robert H. Henderson

ATTORNEY

Dec. 27, 1960 W. D. CANNON 2,966,633

DELAY AND AMPLITUDE CORRECTIVE SYSTEM

Filed Aug. 12, 1958 2 Sheets-Sheet 2

INVENTOR.
W. D. CANNON

BY Robert H. Henderson

ATTORNEY 2,966,633

DELAY AND AMPLITUDE CORRECTIVE SYSTEM

William D. Cannon, Metuchen, N.J., assignor to The Western Union Telegraph Company, New York, N.Y., a corporation of New York Filed Aug. 12, 1958, Ser. No. 754,619

7 Claims. (Cl. 330—20)

This invention is concerned with corrective networks for insertion in a communications line, and more particularly with active networks for use in correcting delay distortion in facsimile transmission lines.

The advantages of using corrective networks of the active rather than the passive type are described in my U.S. application No. 621,476, filed November 9, 1956 for "Method and Means to Overcome Delay Distortion," wherein it is disclosed that by the employment of a network comprising a plurality of active circuits connected in cascade, it becomes possible to provide independent adjustments for delay and frequency correcting components, which are practical only because of their adaptability to adjustment with the aid of an improved measuring instrument there described.

In the instant invention, a new mode of operation of the active network elements is found to preserve the advantages stated in the aforementioned application, while at the same time giving rise to significant new advantages of reliability, space, weight, and power reduction as hereinafter described.

Operation of the active elements of the said networks as current amplifiers to drive further impedance transforming active elements results in an exceedingly compact assembly. Transistors which are currently available can be employed, by the aid of the special circuitry disclosed, to fulfill the theoretical requirements for matching and driving an amplitude and delay corrective network with high effectiveness.

It is accordingly an object of the present invention to provide a compact equipment for correcting delay distortion in a line by means of simple adjustments.

It is a further object to provide such means of correction, adaptable to rapid adjustment to a line, in conjunction with visual distortion displaying equipment.

Another object of the invention is to provide increased reliability in such a device.

A still further object is to provide such an active corrective device adapted for receiving its operating power over a communication channel, by reason of a greatly reduced power consumption.

Figure 1:
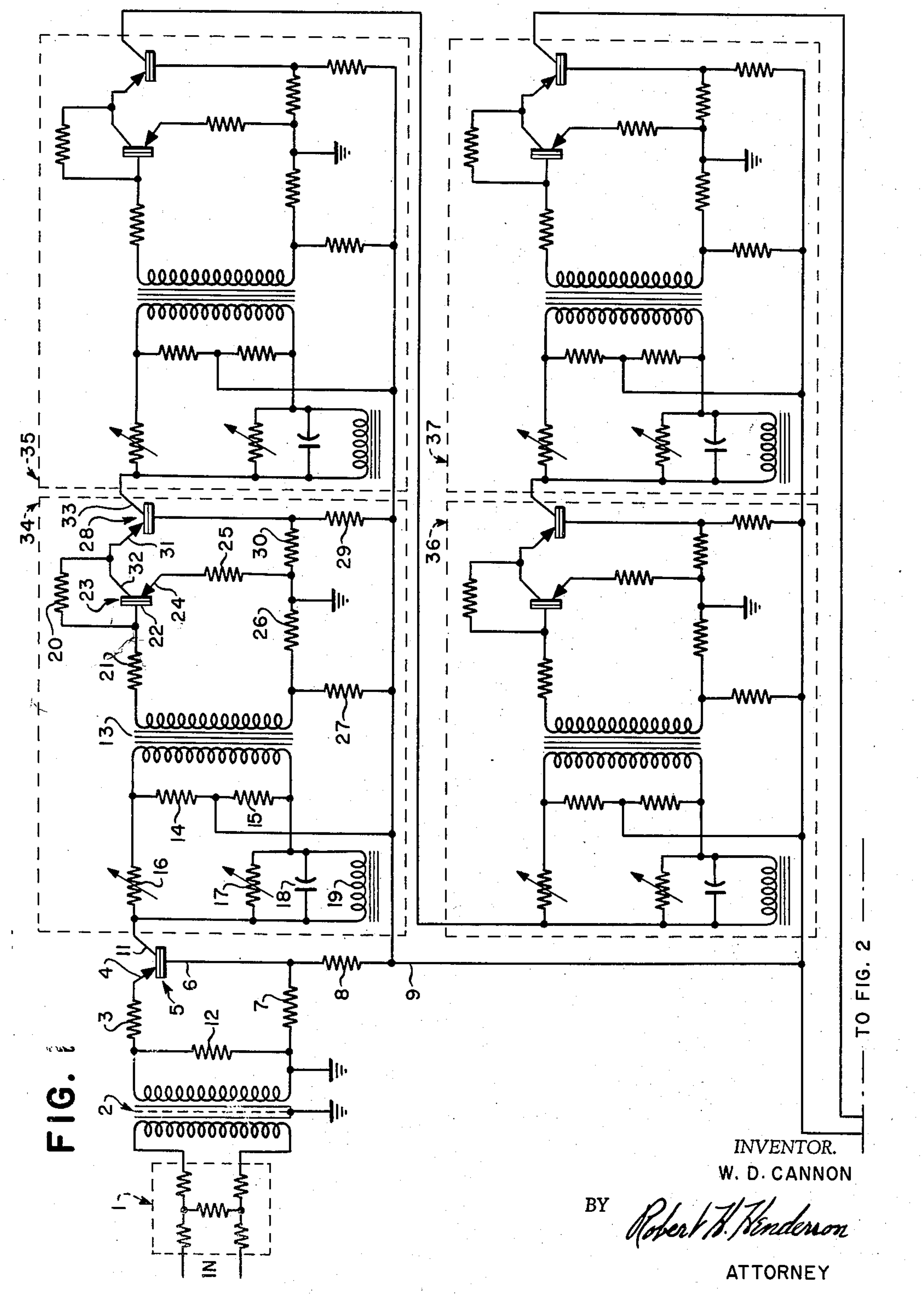
Figure 2:
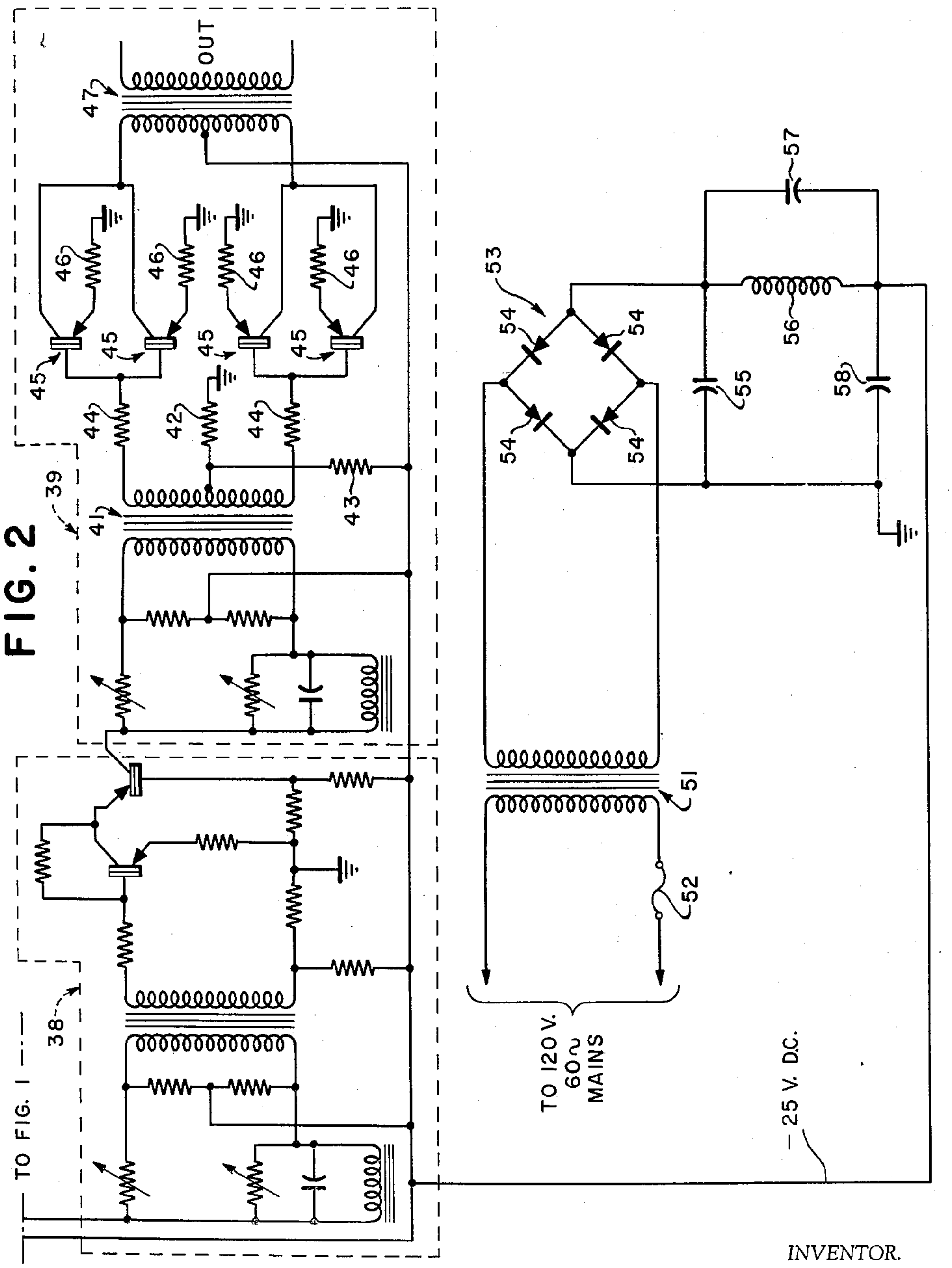

Other objects and advantages of the present invention will appear from a consideration of the following detailed description of a specific illustrative embodiment of the present invention and the drawings wherein:

Fig. 1 is an electrical circuit diagram of an initial portion of a delay and amplitude corrective system according to the present invention; and Fig. 2 is an electrical circuit diagram of a remaining portion of such system.

Referring now to the drawings, in Fig. 1 is seen an attenuator 1 having a pair of wires for input connection from a signal channel not shown, whose delay characteristics are desired to be corrected. The attenuator shown is of the well known H pad type as used in a balanced line, but may equally well be one of the equivalent arrangements, such as an L pad when other types of signal channel are to be accommodated. This is conveniently arranged by making the attenuator 1 of plug-in construction, whereby a variety of different attenuator types and values can be made available for the correction network, which can then be identically reproduced in quantity without need for including a level setting variable attenuator. The output of attenuator 1 is applied to input transformer 2 which conveniently has a turns ratio of 3:1 and an interwinding shield which is grounded as shown. Emerging in unbalanced configuration with one side grounded, the signal current is applied through a resistor 3 which, because of its control of the signal current, provides a degree of automatic volume control and establishes the forward bias current on the emitter 4 of transistor 5, to which it is connected. Transistor 5, like all of the other transistors in the instant invention, which are identical in type and size, is of the so-called p-n-p high gain audio, low power germanium, grown junction type. Many other types of transistor will also perform satisfactorily, however, since the instant invention is very stable and non-critical in operation. Base lead 6 is connected to the junction of resistors 7 and 8 which form a divider from —25 volt supply line 9 to positive ground, thus establishing a suitable supply potential for the circuit of collector 11.

Resistor 12 provides a forward bias current to the emitter 4 corresponding to a desired value of transistor current gain. The collector 11 output circuit of transistor 5 operates at a very much higher impedance level than the above described input circuit, and this is found to be especially advantageous for the operation of the distortion correcting network connected thereto. The said distortion correction network comprises the transformer 13, and a voltage divider connected across the input terminals thereof and comprising resistors 14 and 15 connected in series and having their common junction connected to the —25 volt supply line 9. In addition thereto, the network includes a variable resistor 16 connected between collector 11 and the resistor 14 as one variable leg of the correcting network, and parallel connection of variable resistor 17, condenser 18, and inductor 19 as a second such leg connected between collector 11 and resistor 15. The ratio of the values of resistors 14 and 15 is critical, and must be maintained at substantially about 3:1 in order for the circuit to operate successfully.

This is under the preferred, practical, and described condition that adjustable resistors 16 and 17 have equal values at median gain. It is possible to provide an operative circuit wherein said resistors 16 and 17 do not have such equal values, provided that the ratio of the values of resistors 14 and 15 be then established at a value departing from the aforesaid 3:1 ratio by an amount determined by the degree to which resistors 16 and 17 depart from equality. No advantage results from such a design, however, and the practical convenience of employing identical components for resistors 16 and 17 is thereby lost. The interdependence of all of the said resistors is expressed by the following formula:

$$\frac{R_{16}}{R_{17}}=\frac{1}{2}\left(\frac{R_{14}}{R_{15}}-1\right)$$

wherein $R_{15}$ etc. represent the respective resistors 15, etc. as above mentioned, and from which is can be seen that for small deviations from the aforementioned preferred design, a condition of substantial proportionality exists between the expressed ratios, also expressible as a condition of equal percent of change thereof. The aforesaid second leg of the distortion correction network constitutes a tuned circuit having an appropriate resonance frequency, broadened and flattened by the resistor 17 as required, and preselected to determine the portion of the signal passband upon which the correction supplied by this circuit is to operate.

The frequency range over which each such distortion corrective network is operative to provide correction, conveniently may be 375 cycles in a practical installation, in which case twenty-five successive sections would be employed to obtain the best performance available from a line badly degraded by delay distortion, over the facsimile frequency band of 600–15,000 cycles per second. The successive sections are spaced at approximately uniform frequency intervals and are operative not only within their assigned interval but in diminishing degree for a substantial distance above and below the frequencies thereof. Essentially uniform spacing of the networks according to frequency rather than on a percentage basis is permissible because the higher frequencies of the facsimile band are of greater importance in producing a facsimile image of high quality than are the lower frequencies which are more remote from the carrier frequency. A useful refinement of such spacing, however, is to group the networks somewhat more closely together frequency-wise near the center of the facsimile band then at its ends. By this means, greater distortion corrective power of the networks is concentrated in the region usually having the greatest distortion. It should be understood, however, that in cases where the distortion to be corrected is less severe than above described, a smaller number of corrective networks, more broadly tuned and more widely spaced in the facsimile band, are sufficient to provide an adequately corrected signal. Successive identical circuits tuned to a succession of spaced frequencies by preselection of the appropriate values of condenser 18 and inductor 19 are employed to provide correction to adjacent narrow frequency bands throughout the spectrum of interest although the use of only a few or even of a single such filter section is entirely feasible where only a small degree of correction is needed. Variable resistors 16 and 17 are adjusted simultaneously and identically to control the delay, and resistor 17 alone to control the amplitude, of the assigned frequency band for the particular pair of resistors involved, substantially without interaction of the two effects and these comprise the adjustments necessary to be made in each section of the corrective system for the several bands. Such adjustments are conveniently made by means of a visual display of the delay characteristics of the entire line under consideration together with the corrective network in question, as can be accomplished with the aid of the equipment and technique disclosed in my application Serial No. 621,476, filed November 9, 1956, and entitled "Method and Means to Overcome Delay Distortion."

Emerging from transformer 13 which is a step-down transformer for matching the high impedance corrective network above described to the input impedance of the following transistor, signals are applied through a resistor 21 to the base 22 of transistor 23 which is arranged in the common emitter connected configuration for maintaining signal amplitude, the signal circuit being completed through emitter 24, resistor 25 and resistor 26. Forward bias current is provided through resistor 27 connected to the negative supply line. A resistor 20 connected between base and collector of transistor 23 provides stabilizing negative feedback to the operation of said transistor. The directly coupled following transistor 28 is similarly supplied with bias current by divider resistors 29, 30, the same current flowing through its emitter 31, collector 32 and the emitter 24 of transistor 23, and resistor 25, for modulation by the transistor 23 of the bias of the base connected impedance matching transistor 28. It is to be noted that in the case of the transistors just described, and in the case of all other transistors in the network of this invention, a single source of direct current is all that is needed to energize them, and this makes possible the use of a simple and convenient power supply later to be described.

Emerging from the collector 33 of transistor 28, the signal enters an active corrective network 35 in all respects similar to that of numeral 34, as just described, but having its corrective network tuned by the selection of component magnitudes to an adjacent relatively narrow pass band of frequencies, upon which it is operative to correct amplitude and delay discrepancies. Numerals 36, 37, and 38 denote similar corrective units connected in cascade, and tuned to operate over successive and adjacent narrow frequency bands within the desired pass band of the channel.

Numeral 39 denotes a final corrective unit comprising adjustable delay and amplitude corrective circuitry as above described and connected to energize the primary winding of the interstage transformer 41 having a push-pull output. The secondary center tap of transformer 41 is seen to be provided with a bias potential by connection to the junction of voltage divider resistors 42 and 43 which are connected between ground and the 25 volt negative supply line, and bias current, limited by base resistors 44 is thus supplied to the two pairs of transistors 45, which are connected in a parallel push-pull circuit for the purpose of supplying substantial signal output power from the system. This output stage amplifies the entire facsimile band with equal gain, and is for the purpose of restoring the signals to line level, from the level of approximately zero decibels which prevails in the corrective networks for reasons of convenience.

Such output is supplied to a suitable balanced load circuit by means of a transformer 47.

A power supply to actuate the active corrective networks in the above described system is conveniently composed of a step-down transformer 51, having a fuse 52 in the input wires connecting it to the power mains, and having its low voltage secondary winding connected to the diode bridge rectifier 53 composed of identical semiconductor rectifiers 54. Full wave rectified current is withdrawn from the alternate vertices of bridge rectifier 53 and converted to substantially pure direct current by a single section filter section consisting of an input condenser 55 which smooths and increases the voltage, a circuit anti-resonant at double the line frequency consisting of choke 56 and condenser 57 and comprising a relatively high impedance to the flow of current at ripple frequency, and the condenser 58. Direct current output is provided between positive ground and a supply line of minus 25 volts, as indicated on the drawing. It is because of the very small current drawn by the active components of the instant system in comparison with vacuum tube operated devices of the prior art that it is practical to use a single section filter in the power supply as described, since the low current requirements, which in practice amount to only about eight milliamperes, enables an inductor 56 to be used which has a sufficiently high ratio of reactance to resistance in order to enable it to be tuned to an effective peak of anti-resonance by means of the condenser 57. A further important advantage of the instant invention is gained by reason of the fact that the power required to operate the instant system is only about two watts, instead of about 100 watts, as required by arrangements of the prior art. As a consequence of this, several of the component parts of the power supply are not only smaller, but the entire assembly of corrective networks and power supply can be housed in a smaller container than would otherwise be possible, since little or no provision need be made for dissipation of waste heat by means of extended radiating surfaces, air convection, or other means. It is further practical with the aid of the instant invention, because of the fact the low power consumption attained does not represent an excessive loading for communications circuits, to energize the entire corrective system by electricity transmitted over the signal channel at a convenient frequency outside the communication band, and to do this despite the relatively low power handling ability usually encountered in such signal channels.

Although this invention has been described in terms of a specific illustrative example of the best embodiment thereof, various modifications will occur to those skilled in the art, which do not depart from the essential sp.rit of the invention disclosed. It is therefore intended that this invention shall be limited only by the appended claims.

What is claimed is:

1. Transmission delay and amplitude distortion corrective means comprising as serially connected transmission elements, input line coupling means, at least one corrective bridge section, inter-section matching means connected between each said bridge section and a next successive said bridge section, and terminal output amplifying means wherein: said inter-section matching means comprises a first transistor in common emitter configuration, a second transistor in common base configuration directly connected for driving from the collector of said first transistor, and a resistor interconnecting the base of the first and the emitter of said second transistor, said terminal output amplifying means comprises a transistor amplifier, and each said corrective bridge section comprises two separate shunt paths across an input, a first said path comprising adjustably damped antiresonant circuit means joined in series with a first ratio impedance, and a second said path comprising an adjustable resistor joined in series with a second ratio impedance, the ratio of said ratio impedances being substantially about 3:1, and means including said ratio impedance for coupling out a bridge output from across the said joints, said adjustable resistor having a value substantially about equal to the equivalent parallel damping resistance of said antiresonant circuit means, and said antiresonant circuit means of each of said bridge means being antiresonant in the neighborhood of a specific preselected segment of transmission frequency band to be corrected, whereby simultaneous and equal adjustment of the degree of damping of said circuit means and of said adjustable resistor influences only delay correction, and adjustment of said adjustable resistor alone influences only amplitude correction, of a said specific band segment.

2. The device of claim 1 wherein said adjustably damped antiresonant circuit means comprises an adjustable damping resistor.

3. The device of claim 2 wherein said input line coupling means comprises an attenuator, a coupling transformer, and a common base connected transistor amplifier operated from said transformer.

4. The device of claim 1 wherein said adjustably damped antiresonant circuit comprises a parallel resonant circuit and an adjustable damping resistor connected thereacross.

5. The device of claim 4 wherein said ratio impedances comprises a pair of resistors, and the said means for coupling out a bridge output comprises a transformer having a primary winding connected across the said joints.

6. The device of claim 4 wherein said terminal output amplifying means comprises a plurality of parallel pairs of common emitter connected transistors, connected for push-pull operation between the pairs, and wherein an output transformer is connected to the output of said transistors.

7. A device which includes corrective means according to claim 6, a power supply therefor, and a filter choke in said power supply which is tuned to resonance at the second harmonic of the power line frequency.

References Cited in the file of this patent

UNITED STATES PATENTS

| | | |
|---|---|---|
| 2,710,315 | Tongue | June 7, 1955 |
| 2,790,035 | Hylos et al. | Apr. 23, 1957 |